US006594253B1

(12) United States Patent
Sallberg et al.

(10) Patent No.: US 6,594,253 B1
(45) Date of Patent: Jul. 15, 2003

(54) SYSTEM AND METHOD FOR MOBILITY MANAGEMENT FOR AN INTERNET TELEPHONE CALL TO A MOBILE TERMINAL

(75) Inventors: Krister Sallberg, Lund (SE); Mahesh Patel, Plano, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/163,265

(22) Filed: Sep. 29, 1998

(51) Int. Cl.[7] .............................................. H04L 12/66
(52) U.S. Cl. ...................................... 370/349; 370/352
(58) Field of Search ................................. 370/328, 329, 370/349, 352, 353, 354, 355, 356, 395.2, 395.3, 395.5, 395.52, 401; 455/432, 433, 435

(56) References Cited

U.S. PATENT DOCUMENTS

| | | | |
|---|---|---|---|
| 5,159,592 A | * 10/1992 | Perkins | 370/338 |
| 5,708,655 A | * 1/1998 | Toth et al. | 370/313 |
| 5,901,352 A | * 5/1999 | St-Pierre et al. | 455/426 |
| 5,918,016 A | * 6/1999 | Brewer et al. | 709/220 |
| 5,983,090 A | * 11/1999 | Aoki | 370/329 |
| 6,052,725 A | * 4/2000 | McCann et al. | 709/223 |
| 6,061,346 A | * 5/2000 | Nordman | 370/352 |
| 6,147,986 A | * 11/2000 | Orsic | 370/349 |
| 6,230,012 B1 | * 5/2001 | Willkie et al. | 455/435 |
| 6,304,753 B1 | * 10/2001 | Hartmaier | 455/413 |

FOREIGN PATENT DOCUMENTS

WO    WO 96/38018    11/1996

OTHER PUBLICATIONS

Randy H. Katz; *Beyond Third Generation Telecommunications Architectures: The Convergence of Internet Technology and Cellular Telephony*; Mobile Computing and Communications Review, U.S., ACM, New York, New York, vol. 2, No. 2, Apr. 1998, pp. 1–5.
PCT International Search Report dated Jan. 14, 2000.

* cited by examiner

*Primary Examiner*—Kwang Bin Yao
(74) *Attorney, Agent, or Firm*—Jenkens & Gilchrist, P.C.

(57) ABSTRACT

A telecommunications system and method is disclosed for providing mobility management for a Mobile Station (MS) to allow the MS to receive Internet telephone calls when the MS is in idle mode. This can be accomplished by using a voice gateway to transform an incoming Internet phone call to a normal cellular voice call. In addition, by introducing a new Intelligent Network (IN) application, which handles location updates for the MS with a central Internet telephony server, an MS in idle mode can receive incoming Internet telephony calls. The IN application can obtain a temporary Internet Protocol (IP) address for the MS from a Direct Access Unit (DAU) connected to the voice gateway associated with the serving Mobile Switching Center (MSC) and register this temporary IP address with the central Internet server, which uses this temporary IP address to forward incoming Internet telephony calls to the Voice Gateway.

27 Claims, 5 Drawing Sheets

SYSTEM AND METHOD FOR MOBILITY MANAGEMENT FOR AN INTERNET TELEPHONE CALL TO A MOBILE TERMINAL

BACKGROUND OF THE PRESENT INVENTION

1. Field of the Invention

The present invention relates generally to telecommunications systems and methods for connecting a call to a subscriber during an Internet session, and specifically to connecting a call from the Internet to a wireless subscriber when the subscriber's mobile terminal is in idle mode.

2. Background and Objects of the Present Invention

In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the Advanced Intelligent Network (AIN) have made possible the transfer of all types of information through the telephone network without special circuits or long installation cycles. The IN consists of a series of intelligent nodes, each capable of processing at various levels, and each capable of communicating with one another over data links. The IN relies on the Signaling System #7 (SS7) network, which provides the basic infrastructure needed for the various signaling points in the IN. SS7 relies on Common Channel Signaling, which uses a digital facility, but places the signaling information in a time slot or channel separate from the voice and data it is related to. This allows signaling information to be consolidated and sent through its own network apart from the voice network.

The various signaling points in the IN both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

Figure 1:
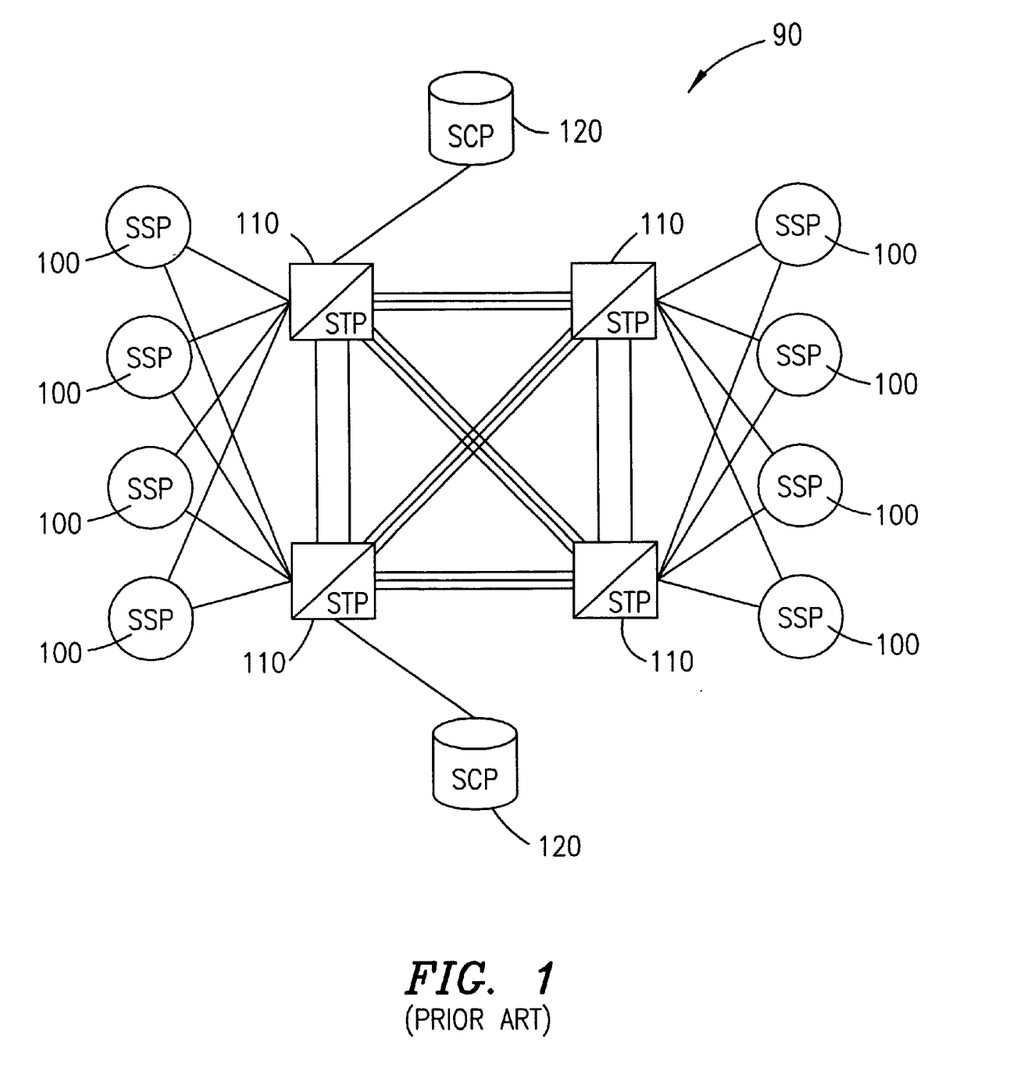
FIG. 1 is a block diagram illustrating some of the basic components used in an Intelligent Network or an Advanced Intelligent Network for signal switching.

With reference now to FIG. 1 of the drawings, the many Service Switching Points (SSPs) 100 serve as the local exchanges in a telephone network 90, a portion of which is shown in FIG. 1. The STP 110 serves as a router, and switches messages received from a particular SSP 100 through the network 90 to their appropriate destinations (another SSP 100). As is also understood in the art, the STP 110 receives messages in packet form from the SSPs 100. These packets are-either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information.

Figure 2:
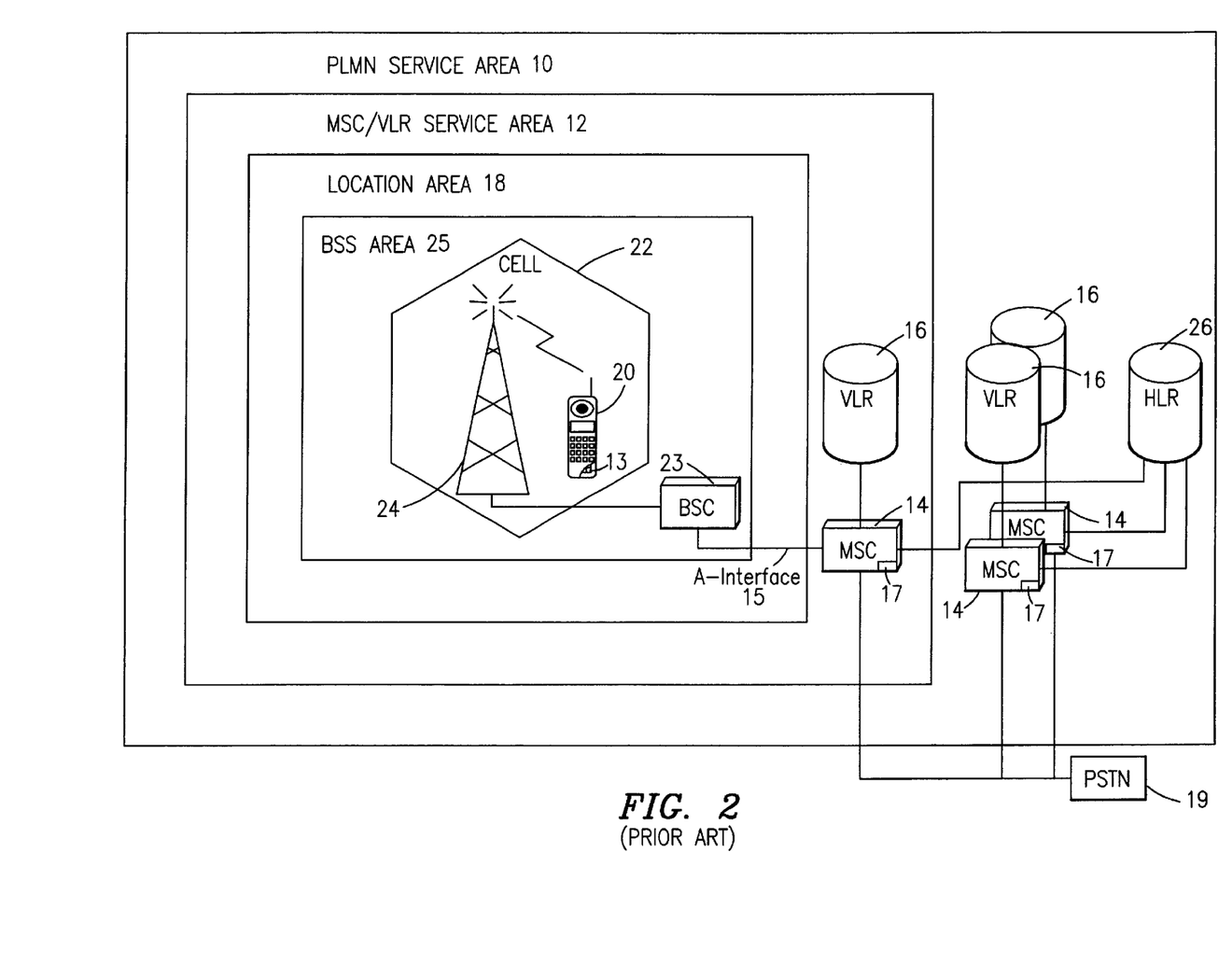
FIG. 2 is a block diagram of a conventional terrestrially-based wireless telecommunications system.

Cellular telecommunications is one of the fastest growing and most demanding telecommunications applications ever. Today it represents a large and continuously increasing percentage of all new telephone subscriptions around the world. Cellular networks have evolved into two different networks. The European cellular network uses the Global System for Mobile Communication (GSM) digital mobile cellular radio system. Although cellular networks in the United States have been traditionally primarily analog, GSM has been implemented in North America, but has been revised to operate in a newly reserved frequency band in the 1900 MHZ range. The revised GSM standard is also known as Personal Communication Services 1900 or PCS 1900. FIG. 2 illustrates the typical components of a GSM/PCS 1900 wireless communications system 10.

The GSM/PCS 1900 wireless communications system 8 is located within a geographical area serviced by a single provider, hereinafter referred to as the Public Land Mobile Network (PLMN) 10. The basic components of the wireless communications system 10 are a Base Station System (BSS) 25, a Mobile Switching Center (MSC) 14 and a Mobile Station (MS) 20. At least one BSS 25 is deployed within the. PLMN 10. The BSS 25 acts as an interface between the MSC 14 and a plurality of MSs 20. The MS 20 may be a mobile wireless telephone, a pager or other equipment. The MS 20 may not access the GSM/PCS 1900 wireless communications system 10 without providing subscriber specific data for the MS 20. This data is provided through use of a Subscriber Identity Module (SIM) card 13 which is plugged into the MS 20, or other memory. The SIM card 13 allows the subscriber to access the network through any MS 20 in which the subscriber has inserted their SIM card 13. The SIM card 13 includes such data as a subscriber authentication key, e.g., the International Mobile Subscriber Identity (IMSI) number, temporary network data, service related data (e.g. language preference), charging information and other data.

The BSS 25 includes a Base Transceiver Station (BTS) 24 and a Base Station Controller (BSC) 23. The BTS 24 operates as a transceiver for transmitting and receiving data and control messages to and from the MS 20 over the air interface. The BSS 25 is connected to the MSC 14 through dedicated telephone lines through an A-interface 15. Also connected to the MSC 14 is a Visitor Location Register (VLR) 16 and a Home Location Register (HLR) 26. The HLR 26 is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 2.

The VLR 16 is a database containing information about all of the MSs 20 currently located within the MSC/VLR area 12. If a MS 20 roams into a new MSC/VLR area 12, the VLR 16 connected to that MSC 14 will request data about that Mobile Station (terminal) 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

An interworking function (IWF) 17 within the MSC 14 links the wireless communications system 10 to the Public Switched Telephone Network (PSTN) 19. The MSC 14 and IWF 17 control the switching of incoming calls to various BSSs 25 and the interfacing of outgoing calls to the PSTN 19.

Figure 3:
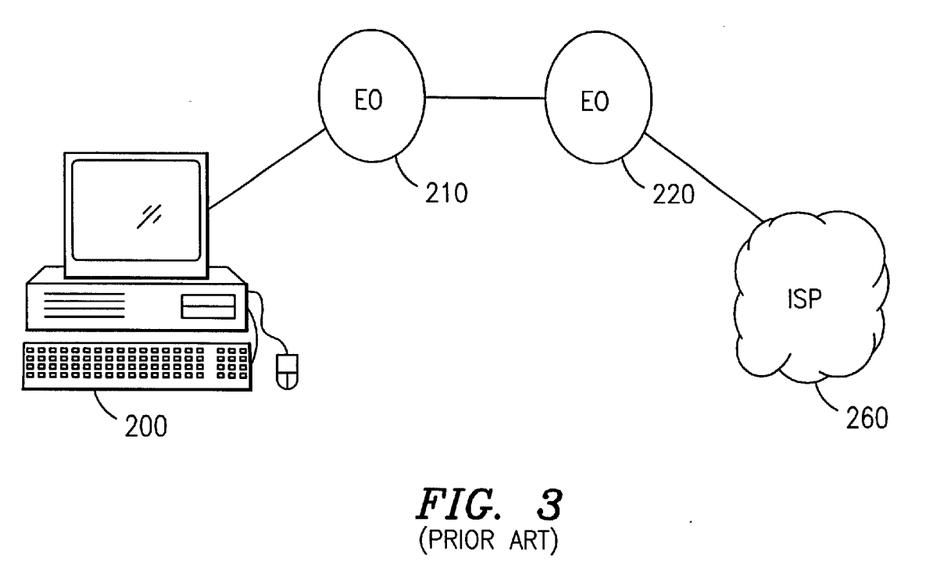
FIG. 3 demonstrates a conventional connection between an Internet Service Provider and an Internet user.

With reference now to FIG. 3 of the drawings, a separate network that provides data, not voice, communications is known as the "Internet". The Internet is based on the Transmission Control Protocol/Internet Protocol (TCP/IP protocol), which was developed as a standard protocol to allow different types of computers to exchange electronic mail and other files over a network. The TCP/IP Protocol specifies the addressing of nodes on the Internet and a provides a method of sending packets of data from one node to another. The TCP or Transmission Control Protocol is an application implemented on top of the IP to provide reliable delivery of the data packets.

Typically, an Internet session begins by an Internet user 200, e.g., a computer, dialing the access number for a specific Internet Service Provider (ISP) 260. This call is then routed from the Internet user's end office 210, e.g., a Service Switching Point (SSP) for a wireline Internet user, or a Mobile Switching Center (MSC) for a wireless Internet user, to an end office (local access point) 220 where the ISP 260 resides. Finally, a Point-to-Point (PPP) protocol or Serial Line Internet Protocol (SLIP) connection is established between the computer's 200 modem and the ISP 260. During a session, digital data is exchanged over the subscriber's line using the standard IP protocol in the form of packets.

All that is required for use of the Internet 260 for telephony purposes is a sound card mounted in a personal computer (PC), a microphone, a pair of speakers connected to the sound card, and a telephony application (software) that recognizes the sound card. Bidirectional voice communication between two telephony applications is then possible, e.g., a subscriber can make and receive calls to or from another PC or the public PSTN, or mobile network.

Currently, the industry is developing systems and methods for allowing a subscriber to make and receive calls on the wireline subscriber line to which a modem is connected during an Internet session. This simultaneous telephony and Internet access over a single Plain Old Telephone Service (POTS) access line, which is not a digital line, is achieved by transforming an incoming POTS call into an Internet phone call when the access line is busy, using modem communications between the subscriber's host computer 200 and an ISP 260. With this technology, it will soon also be possible to place telephone calls by an on-line subscriber through the Internet phone application towards a normal POTS subscriber. This can be accomplished by the Internet phone service being terminated in a voice gateway node to the POTS network, which then routes and carries the phone call.

For wireless applications, the MS 20 is typically connected to the Internet either by use of a Direct Access (DA) service or by a connection to an Internet Service Provider (ISP), as described in FIG. 3 of the drawings. Therefore, the DA service or ISP can allocate a permanent (static) or temporary (dynamic) Internet Protocol (IP) address for the MS 20 on the Internet. This IP address is used to route IP packets to and from the MS 20, as well as the control messages for Internet phone call setup.

Today, mobile telephony networks are using the HLR 26 to provide mobility management when a mobile moves to a different LA. However, for a mobile subscriber to remain reachable for mobile terminating Internet telephone calls while roaming in a visiting PLMN 10, the temporary IP address must be used. Since the MS 20 has a circuit switched call connection to the Direct Access Unit (DAU) of the DA service through the IWF 17 of the MSC 14, mobility management can be implemented when the MS 20 is connected to the Internet, e.g., through a laptop computer, by utilizing the temporary IP address.

However, when the MS 20 is in idle mode, e.g., not involved in a voice call, it does not have an established call connection to the DAU, which means that it cannot be reached for incoming Internet telephone calls. In idle mode, the MS 20 is powered on, attached to the MSC 14, registered in the HLR 26 and a VLR 16, but the location of the MS 20 on a cell 22 by cell 22 basis is not known by the MSC 14.

It is therefore an object of the invention to provide mobility management for a mobile terminal to allow the mobile terminal to receive Internet telephone calls when the mobile terminal is in idle mode.

SUMMARY OF THE INVENTION

The present invention is directed to telecommunications systems and methods for providing mobility management for a Mobile Station (MS) to allow the MS to receive Internet telephony calls when the MS is in idle mode. This can be accomplished by using a voice gateway to transform an incoming Internet phone call into a normal GSM/Cellular voice call. In addition, by introducing a new Intelligent Network (IN) application within an IN node, which handles location updates for the MS with a central Internet telephony server, an MS in idle mode can receive incoming Internet telephony calls. Initially, when the MS roams into a new Location Area, the MS performs a location update to the serving Mobile Switching Center (MSC). The location update triggers the IN application, which then obtains a temporary Internet Protocol (IP) address from the Direct Access Unit (DAU). The DAU also establishes a link with the Voice Gateway and updates the routing tables to enable Internet telephony calls to be forwarded to the Voice Gateway. The IN application then registers the MS's temporary IP address at a central Internet phone server, which uses the temporary IP address to route incoming Internet telephony calls for the MS to the Voice Gateway for call completion to the MS. The particular server to register with is either stored as subscription data within the HLR and VLR or is provided to the IN application by the MS. Advantageously, by using the IN application, the MS can be a normal handset, e.g., there is no need for a laptop computer to receive incoming Internet telephony calls.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 4:
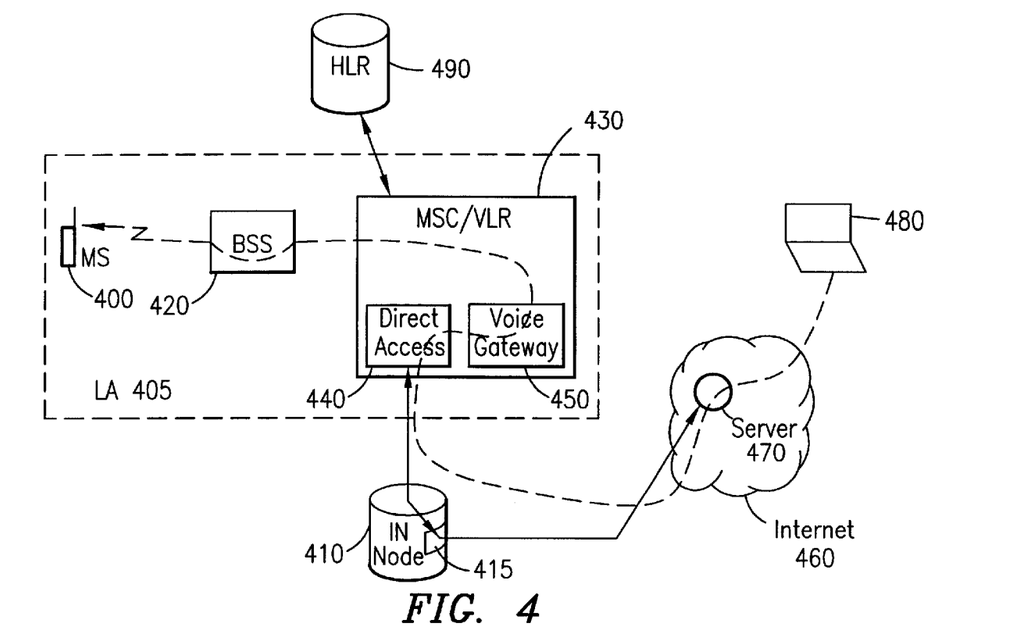
FIG. 4 illustrates routing of an Internet phone call to a mobile terminal in idle mode using a temporary Internet Protocol (IP) address stored in a central Internet server, in which the temporary IP address is provided by a Direct Access Unit (DAU) and updated in the central Internet server by an Intelligent Network (IN) node during location updates of the mobile terminal.

With reference now to FIG. 4 of the drawings, mobility management when a Mobile Station (MS) 400 is in idle mode can be solved by introducing a new Intelligent Network (IN) application 415 within an Intelligent node 410, which handles location updates for the MS 400 with a central Internet telephony server 470. When the MS 400 enters a new Location Area (LA) 405, the MS 400 performs a location update to a Mobile Switching Center/Visitor Location Register (MSC/VLR) 430 serving the LA 405 that the MS 400 is currently located in via a serving Base Station System (BSS) 420. The MSC/VLR then queries a Home Location Register (HLR) 490, which stores subscriber data for that MS 400, for that MS's 400 subscriber data. The HLR 490 then sends the subscriber data for that MS 400, which includes identification information regarding the IN node 410 and central Internet telephony server associated with that MS 400, back to the MSC/VLR 430. It should be noted that the MSC/VLR query is only performed after a location update if the MS 400 has entered a new LA 405, e.g., the MS 400 is new to the MSC/VLR 430.

The location update process triggers the IN application 415 within the IN node 410 associated with the MS 400. The IN application 415 then determines whether a new temporary Internet Protocol (IP) address is needed for the MS 400. If a new temporary IP address is needed, the IN application 415 then obtains the temporary IP address from a Direct Access Unit (DAU) 440 within the MSC/VLR 430. It should be understood that the DAU 440 can be co-located with the MSC/VLR 430 or can be a separate node. A new temporary IP address is only needed if the DAU 440 is co-located with the MSC/VLR 430 and the MS 400 has entered a new LA 405 served by a new MSC/VLR 430 or if the DAU 440 has changed. If a new temporary IP address is not needed and the MS 400 has moved to a new LA 405 and the DAU 440 is not co-located, the IN node 410 will update the DAU 440 with the new MSC/VLR 430 address.

Once the temporary IP address is determined by the DAU 440 and sent to the IN application 415, the IN node 410 then accesses the central Internet phone server 470, which contains the old temporary IP address for the MS 400, and registers the new temporary IP address with the server 470 (if the IN node 410 determines that a new temporary IP address is needed). Information regarding which server 470 to use is stored as subscription data within the HLR 490 and provided to the MSC/VLR 430 during the location update, which can then provide the information to the IN application 415. Alternatively, the server 470 identification information is provided to the IN node 410 by the MS 400 in an earlier service interaction between the MS 400 and IN node 410 and stored within the IN node 410 itself. In addition, it should be noted that the IN node 410 typically includes a Service Control Point (SCP).

Thereafter, or simultaneous to obtaining the temporary IP address, if the DAU 440 is co-located with the MSC/VLR, the DAU 440 determines a corresponding routing entry, e.g., by updating its routing tables (not shown), which is used to route incoming Internet telephony calls to a Voice Gateway 450 within the MSC/VLR 430. However, it should be noted that if the DAU 440 is a separate node, and thus can be connected to multiple Voice Gateways 450, the DAU 440 associates the temporary IP address with the MSC/VLR 430 address to obtain the IP address of the Voice Gateway 450 and routes the call to the Voice Gateway 450 for that MSC/VLR 430. The Voice Gateway 450 transforms the incoming Internet phone call into a normal cellular voice call. It should be understood that the Voice Gateway 450 can be co-located with the MSC/VLR and/or the DAU 440, or can be a separate node.

When an Internet user 480 dials the number for the MS 400, the call is routed through the Internet 460 to the central Internet server 470, which determines the routing information for the call using the stored temporary IP address. The call is then routed to the DAU 440 which then routes the call to the Voice Gateway 450 for connection of the call to the MS 400. Alternatively, the call can be routed to the DAU 440 directly, which can then route the call to the Voice Gateway 450 for connection of the call to the MS 400.

The Voice Gateway 450 terminates the Internet phone application and transforms the incoming call to a standard phone call. The signaling towards the MSC/VLR 430 and the MS 400 is then according to the procedures defined in the GSM standards. In order to determine the called party number, which needs to be included in a Q.931 setup message if a Primary Rate Integrated Services Digital Network interface (PRI) exists between the Voice Gateway 450 and the MSC/VLR 430 or within an ISDN User Part (ISUP) Initial Address Message (IAM) if a Network-to-Network Interface (NNI) exists between the Voice Gateway 450 and the MSC/VLR 430, the called party number can be provided to the Voice Gateway 450 from the IN application 415 and stored in a subscriber profile (not shown) within the Voice Gateway 450. Alternatively, the Internet phone application signaling protocol can be designed to interwork with normal telephone networks and the called party number can be provided by the calling terminal 480 and included in one of the Internet phone application signaling protocol information fields.

Figure 5:
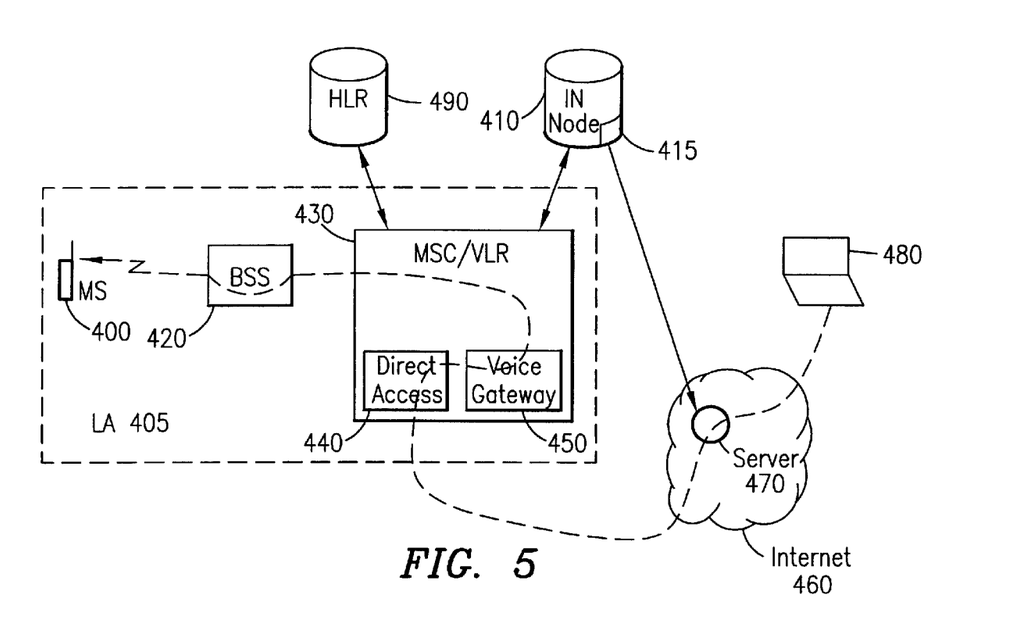
FIG. 5 illustrates routing of an Internet phone call to a mobile terminal in idle mode using a temporary IP address stored in a central Internet server, in which the temporary IP address is provided by the DAU during location updates to the serving Mobile Switching Center, which then forwards the IP address to the IN node for updating the central Internet server.

In an alternative embodiment, as shown in FIG. 5 of the drawings, after the MS 400 performs a location update to the MSC/VLR 430, and the subscriber data along with the IN node 410 and central Internet server 470 identification information is sent back to the MSC/VLR 430 from the HLR 490, the MSC/VLR 430 itself can obtain the temporary IP address from the DAU 440. It should be noted that information is obtained from the HLR 490 only when the MS 400 has entered a new LA 405. In addition, a new temporary IP address is only allocated when the MS 400 has entered a new LA 405 and the DAU 440 is co-located with the MSC/VLR 430. Otherwise, if the MS 400 has entered a new LA 405, but the DAU 440 is a separate node, the new MSC/VLR 430 provides the DAU 440 with the new MSC/VLR 430 address. Thereafter, the DAU 440 can establish a link with the Voice Gateway 450 and update the routing tables accordingly.

Once the temporary IP address has been allocated by the DAU 440 and forwarded to the MSC/VLR 430, the MSC/VLR can inform the IN application 415 within the IN node 410 of the location update and include the allocated temporary IP address. The IN application 415 can then register the temporary IP address with the central Internet server 470 in order to route incoming Internet telephony calls from an Internet user 480 to the MS 400 via the Voice Gateway 450.

Figure 6:
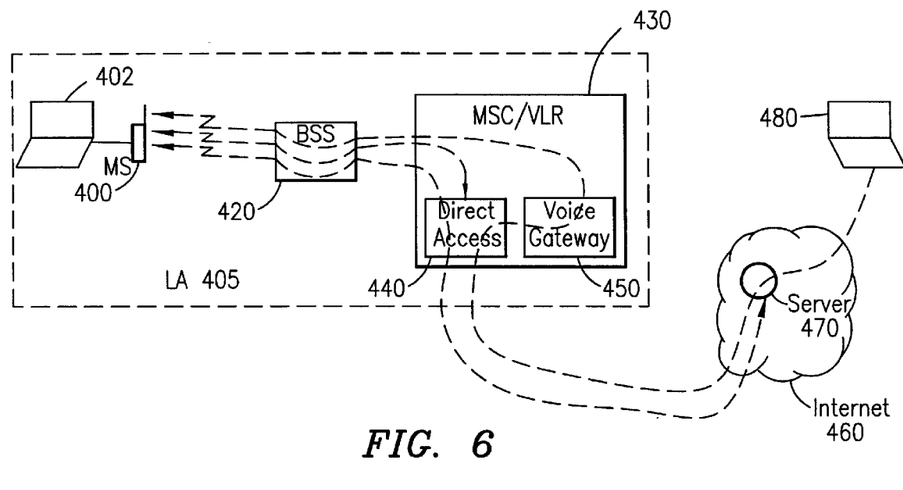
FIG. 6 illustrates routing of an Internet phone call to a mobile terminal in idle mode using a temporary Internet Protocol (IP) address stored in a central Internet server, in which is provided by the DAU and updated by a laptop connected to the mobile terminal during location updates of the mobile terminal.

In a further alternative embodiment, as shown in FIG. 6 of the drawings, mobility management can be handled by the MS 400 itself. For example, when the MS 400 enters a new LA 405, the subscriber associated with the MS 400 can dial a special number and place a call to the DAU 440 within the serving MSC/VLR 430 via the serving BSS 420, and establish Point-to-Point (PPP) protocol or Serial Line Internet Protocol (SLIP) and Internet Protocol (IP) between a laptop 402 connected to the MS 400 and the DAU 440. The DAU 440 can then allocate a temporary IP address for the MS 400 (if the DAU 440 has changed) and send this temporary IP address back to the laptop 402 connected to the MS 400. The laptop 402 can then register the temporary IP address, transparently via the DAU, with the central Internet phone server 470. The MS 400 can then disconnect from the DAU 440, and the DAU 440 can then determine an associated routing entry, which is used to forward the Internet call to the Voice Gateway 450.

Thereafter, when a call is placed to the MS 400 from an Internet User 480, the call is routed through the Internet 460 to the central Internet server 470, which uses the temporary IP address and associated routing entry to route the call to the Voice Gateway 450 of the serving MSC/VLR 430. The Voice Gateway 450 can then connect the call to the MS 400.

Alternatively, a program within the laptop 402 can instruct the MS 400 to report when a location update has been performed and subsequently to dial the number associated with the DAU 440 to obtain a new temporary IP address. Therefore, the mobile subscriber associated with the MS 400 need not remember to obtain a new temporary IP address every time the subscriber roams into a new location area 405.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be understood that the aforementioned concepts can be applied to any cellular network, including, but not limited to, the Global System for Mobile Communication (GSM) system, the Personal Communications Service (PCS) system, the AMPS system, or the D-AMPS system.

In addition, it should be noted that the Home Location Register (HLR) can obtain the temporary IP address from the DAU and update the central Internet server accordingly instead of the IN node performing the updating.

What is claimed is:

1. A telecommunications system for connecting an Internet call to a mobile terminal in wireless communication with a mobile switching center when said mobile terminal is in idle mode, said telecommunications system comprising:

a direct access unit for allocating a temporary address associated with said mobile terminal when said mobile terminal first enters a location area served by said mobile switching center;

an Internet server operatively connected to said mobile switching center and the Internet, said Internet server being further associated with said mobile terminal, said Internet server being identified based on an identity of said mobile terminal, said Internet server further for receiving said temporary address allocated to said mobile terminal and storing said temporary address for use in connecting said Internet call to said mobile terminal;

an intelligent node connected to receive said temporary address from said direct access unit, access said Internet server and register said temporary address within said Internet server; and a voice gateway connected to said mobile switching center and said direct access unit, said Internet call being routed to said voice gateway via said Internet server using said temporary address, said voice gateway connecting said Internet call to said mobile terminal.

2. The telecommunications system of claim 1, wherein said temporary address stored in said Internet server is updated by an intelligent node.

3. The telecommunications system of claim 2, wherein said direct access unit provides said temporary address to said mobile switching center when said mobile terminal enters said location area served by said mobile switching center, said intelligent node receiving said temporary address from said mobile switching center, said intelligent node accessing said Internet server and registering said temporary address within said Internet server.

4. The telecommunications system of claim 1, further comprising a computer connected to said mobile terminal, said computer connecting to said direct access unit when said mobile terminal enters said location area served by said mobile switching center, said computer obtaining said temporary address from said direct access unit and registering said temporary address within said Internet server via said direct access unit.

5. The telecommunications system of claim 4, wherein Point-to-Point protocol and Internet Protocol is established between said computer and said direct access unit when said computer obtains said temporary address.

6. The telecommunications system of claim 1, wherein said voice gateway transforms said Internet call into a cellular voice call, said cellular voice call being connected to said mobile terminal.

7. The telecommunications system of claim 1, wherein said Internet call is connected to said mobile terminal via a base station system connected to said mobile switching center.

8. The telecommunications system of claim 1, wherein said Internet call is connected to said mobile terminal by routing said call through the Internet, said Internet server, and said voice gateway.

9. The telecommunications system of claim 1, wherein said direct access unit determines a routing entry associated with said temporary address, said Internet call being routed to said voice gateway using said routing entry.

10. The telecommunications system of claim 9, wherein said direct access unit is co-located with said mobile switching center.

11. The telecommunications system of claim 9, wherein said direct access unit is not co-located with said mobile switching center, said direct access unit allocating said temporary address when said mobile terminal first enters said location area served by said mobile switching center and said direct access unit has not already allocated said temporary address to said mobile terminal, said routing entry being the address of said mobile switching center.

12. A method for connecting an Internet call to a mobile terminal in wireless communication with a mobile switching center when said mobile terminal is in idle mode, said method comprising the steps of:

performing, by said mobile terminal, a location update to said mobile switching center when said mobile terminal first enters a location area served by said mobile switching center;

determining, by a direct access unit, a temporary address associated with said mobile terminal;

identifying an Internet server connected to the Internet and associated with said mobile terminal based on an identity of said mobile terminal;

receiving, by an intelligent node, said temporary address from said direct access unit;

accessing, by said intelligent node, said Internet server;

registering said temporary address within said Internet server by said intelligent node;

routing, by said Internet server, said Internet call to a voice gateway connected to said mobile switching center and said direct access unit using said temporary address; and connecting, by said voice gateway, said Internet call to said mobile terminal.

13. The method of claim 12, wherein said step of registering said temporary address within said Internet server is performed using an intelligent node.

14. The method of claim 13, further comprising, before said step of registering, the steps of:

providing, by said direct access unit, said temporary address to said mobile switching center when said mobile terminal enters said location area served by said mobile switching center;

receiving, by said intelligent node, said temporary address from said mobile switching center;

accessing, by said intelligent node, said Internet server; and registering said temporary address within said Internet server by said intelligent node.

15. The method of claim 12, further comprising, before said step of determining, the steps of:

connecting, by a computer connected to said mobile terminal, said computer to said direct access unit via said mobile terminal when said mobile terminal enters said location area served by said mobile switching center;

obtaining, by said computer, said temporary address from said direct access unit; and registering, by said computer, said temporary address within said Internet server via said direct access unit.

16. The method of claim 15, wherein Point-to-Point protocol and Internet Protocol is established between said computer and said direct access unit during said step of obtaining.

17. The method of claim 12, further comprising, before said step of connecting said Internet call, the step of:

transforming, by said voice gateway, said Internet call into a cellular voice call, said step of connecting including the step of connecting said cellular voice call to said mobile terminal.

18. The method of claim 12, wherein said step of connecting includes said step of connecting said Internet call to said mobile terminal via a base station system connected to said mobile switching center.

19. The method of claim 12, wherein said step of routing includes said step of routing said call through the Internet and said Internet server to said voice gateway.

20. The method of claim 12, further comprising, after said step of determining, the step of:

determining, by said direct access unit, a routing entry associated with said temporary address, said step of routing including the step of routing said Internet call to said voice gateway using said routing entry.

21. The method of claim 20, wherein said step of determining said temporary address is performed before said step of performing said location update when said direct access unit is not co-located with said mobile switching center and said direct access unit has not changed when said step of performing occurs, said routing entry being the address of said mobile switching center when said direct access unit is not co-located with said mobile switching center.

22. A mobile switching center for connecting a packet call to a mobile terminal in idle mode, said mobile switching center comprising:

a direct access unit for allocating a temporary address associated with said mobile terminal when said mobile terminal first enters a location area served by said mobile switching center;

means for identifying a server associated with said mobile terminal and connected to a packet network based on an identity of said mobile terminal;

means for providing said temporary address allocated to said mobile terminal to an intelligent node for registering said temporary address within said server; and a voice gateway for receiving said packet call from said server using said temporary address and connecting said packet call to said mobile terminal.

23. The mobile switching center of claim 22, further comprising:

means for querying a home location register of said mobile terminal for subscriber data associated with said mobile terminal, said subscriber data including an identity of said server.

24. An intelligent node within an intelligent network, comprising:

means for obtaining a temporary address allocated to an idle mobile terminal upon said mobile terminal entering a new location area served by a mobile switching center in wireless communication with said mobile terminal, said temporary address being associated with at least said location area;

means for identifying a server associated with said mobile terminal and connected to a packet network based on an identity of said mobile terminal; and means for registering said temporary address allocated to said mobile terminal with said server for use in routing packet calls from said server to said mobile terminal via said mobile switching center using said temporary address.

25. A mobile station for updating a packet network with routing information to receive incoming packet calls while in idle mode, comprising:

means for obtaining a temporary address upon entering a new location area served by a mobile switching center in wireless communication with the mobile station, said temporary address being associated with at least said location area;

means for identifying a server for the mobile station and connected to the packet network; and means for providing said temporary address allocated to said mobile terminal to an intelligent node for registering said temporary address within said server for use in routing packet calls from said server to the mobile station via said mobile switching center using said temporary address.

26. The mobile station of claim 25, wherein said means for obtaining further comprises:

means for connecting to a direct access unit serving at least said mobile switching center to receive said temporary address allocated by said direct access unit to said mobile station.

27. A method for connecting a packet call to a mobile terminal in idle mode, comprising:

allocating a temporary address associated with said mobile terminal when said mobile terminal first enters a location area served by a mobile switching center in wireless communication with said mobile terminal;

identifying a server associated with said mobile terminal and connected to a packet network based on an identity of said mobile terminal;

providing said temporary address allocated to said mobile terminal to an intelligent node for registering said temporary address within said server; and connecting said packet call from said server to said mobile terminal using said temporary address.

* * * * *